No. 691,774. Patented Jan. 28, 1902.
D. J. JONES.
ATTACHMENT FOR VEHICLE SHAFTS.
(Application filed June 21, 1901.)
(No Model.)
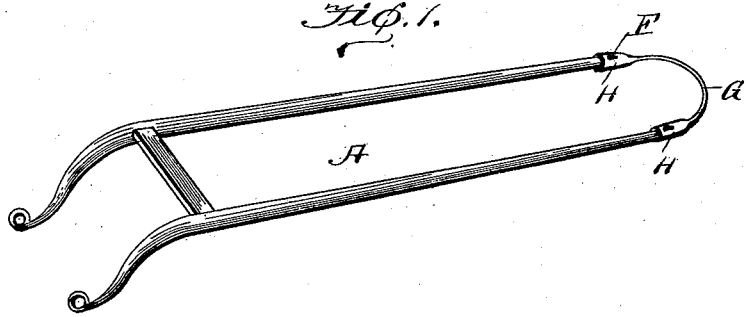
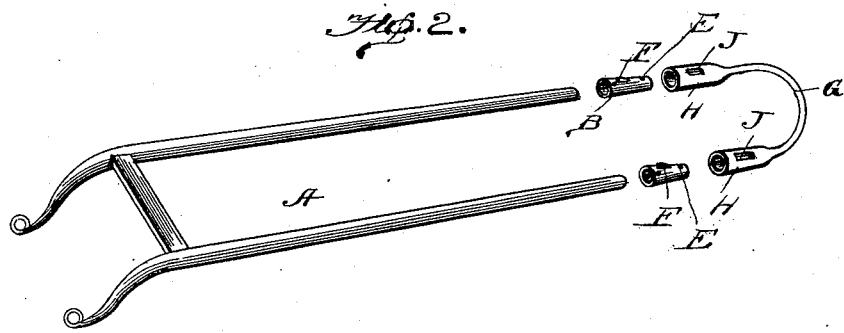
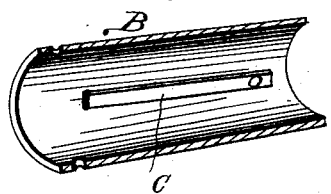
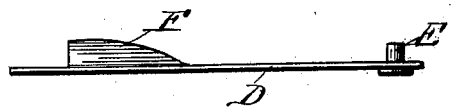
Witnesses
Bernard M. Offutt
M. W. Johnson
Inventor
David J. Jones,
by David P. Moore,
Attorney
THE NORRIS PETERS CO., PHOTO-LITHO., WASHINGTON, D. C.

UNITED STATES PATENT OFFICE.

DAVID J. JONES, OF OLATHE, KANSAS.

ATTACHMENT FOR VEHICLE-SHAFTS.

SPECIFICATION forming part of Letters Patent No. 691,774, dated January 28, 1902.

Application filed June 21, 1901. Serial No. 65,443. (No model.)

*To all whom it may concern:*

Be it known that I, DAVID J. JONES, a citizen of the United States, residing at Olathe, in the county of Johnson and State of Kansas, have invented certain new and useful Improvements in Shaft Attachments, of which the following is a specification.

This invention relates to improvements in shaft attachments, and has special reference to an attachment to be placed upon the ends of the shafts to prevent the reins or lines from catching under the shafts and also to provide a guard for the horse and to strengthen the shafts, as a bow is connected to the ends, so as to make the shafts continuous around in front of the horse.

The main object of my invention is the provision of a device of this character which is easily and quickly attached and detached from the shaft's ends when the horse is hitched to a vehicle or is being unhitched and one which is very simple, durable, and cheap, as well as thoroughly efficient and practical in use.

With these objects in view the invention consists of a shaft attachment embodying novel features of construction and combination of parts substantially as disclosed herein, and particularly set forth in the claim.

In the drawings, Figure 1 is a perspective view of a pair of shafts with my attachment in place thereon. Fig. 2 is a similar view of the shafts with the attachment removed therefrom in detail. Fig. 3 is a sectional perspective of the ferrule secured to the ends of the shaft, and Fig. 4 is a side elevation of the spring-catch.

In the drawings and referring more particularly thereto the letter A designates a pair of shafts of a vehicle having secured to the outer ends thereof, by means of bolts or rivets, the ferrule B, provided with the longitudinal slot C. Secured upon the inner side of this ferrule, by means of the screw or stud E, and extending in line with the slot is the spring-plate D, provided with the curved and square-shouldered projection, lug, or abutment F. Adapted to connect the ends of the shafts together is the metal or wooden bow G, which is provided with the integral ferrules or cup-shaped caps H, which fit snugly upon the ferrule B, so that the lug F fits into the slot J of the ferrules H, and thus holds the bow in position, so that any pulling effect or tension will not release the bow.

From this description, taken in connection with the drawings, the operation of my improved attachment is readily understood and its numerous advantages fully appreciated; but I would simply say that to place the bow in position it is simply necessary to push its ferrules over the ferrule upon the ends of the shaft, when the spring-catches will enter the openings or slots of the bow's ferrule and prevent the bow from being removed until the spring-catches are pressed inward and out of engagement with the slot of the bow's ferrules.

Thus it will be seen that I provide a very simple, durable, and inexpensive attachment which is very useful and practical.

What I claim, and desire to secure by Letters Patent, is—

In combination with a pair of shafts, of an attachment therefor, comprising a pair of tapering ferrules provided each with a slot or opening and secured rigidly to the ends of the shafts, a spring-plate having its inner end secured to the interior face of each ferrule, a lug or catch carried upon the upper face of the plate near the free end, said lug or catch protruding through and guided by the slot, and a bow having formed integral with each of its ends a ferrule or cap provided with a slot to correspond with the slot of the other ferrules and adapted to allow the lug to enter the slot to hold the bow upon the ends of the shaft.

In testimony whereof I affix my signature in presence of two witnesses.

DAVID J. JONES.

Witnesses:
  S. H. GIVLER,
  J. P. HINDMAN.